(12) United States Patent
Monday

(10) Patent No.: US 6,480,860 B1
(45) Date of Patent: Nov. 12, 2002

(54) TAGGED MARKUP LANGUAGE INTERFACE WITH DOCUMENT TYPE DEFINITION TO ACCESS DATA IN OBJECT ORIENTED DATABASE

(75) Inventor: Paul Brian Monday, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/249,783

(22) Filed: Feb. 11, 1999

(51) Int. Cl.$^7$ .............................................. G06F 17/30
(52) U.S. Cl. ........................ 707/102; 707/5; 707/10; 707/100; 707/103; 707/513; 717/116
(58) Field of Search ...................... 707/1–6, 100–104.1, 707/500.1, 501.1, 513, 531; 717/1–11, 111, 114–116, 147, 153, 167, 513; 709/201–202, 213, 217, 249, 223, 315, 331–332; 705/23, 26, 27

(56) References Cited

U.S. PATENT DOCUMENTS

| 5,752,021 A | * | 5/1998 | Nakatsuyama | ............... | 395/605 |
|---|---|---|---|---|---|
| 5,848,386 A | * | 12/1998 | Motoyama | ...................... | 704/5 |
| 6,012,098 A | * | 1/2000 | Bayeh | .......................... | 709/246 |
| 6,052,531 A | * | 4/2000 | Waldin | ......................... | 395/712 |
| 6,064,977 A | * | 5/2000 | Haverstock | .................... | 705/9 |
| 6,125,391 A | * | 9/2000 | Meltzer | ........................ | 709/223 |
| 6,173,279 B1 | * | 1/2001 | Levin | ............................. | 707/5 |
| 6,279,006 B1 | * | 8/2001 | Shigemi et al. | ............. | 707/101 |

\* cited by examiner

Primary Examiner—Srirama Channavajjala

(57) ABSTRACT

An apparatus and method defines a markup language for accessing data in a database. The markup language is preferably defined in extensible markup language (XML) by creating suitable document type definitions (DTDs), which define the grammar for accessing data in the database using the markup language. A bridge interprets the data request from the client in markup language format, a suitable database query for the database is formulated, and the data is then placed within a document for delivery in markup language format to the user. As new data types are added to the database, corresponding document type definitions (DTDs) may be dynamically generated, allowing a user to access new kinds of data in a database with a software tool that has a user-friendly graphical user interface without having to manually update the software tool for each new data type that is added to the database.

27 Claims, 5 Drawing Sheets

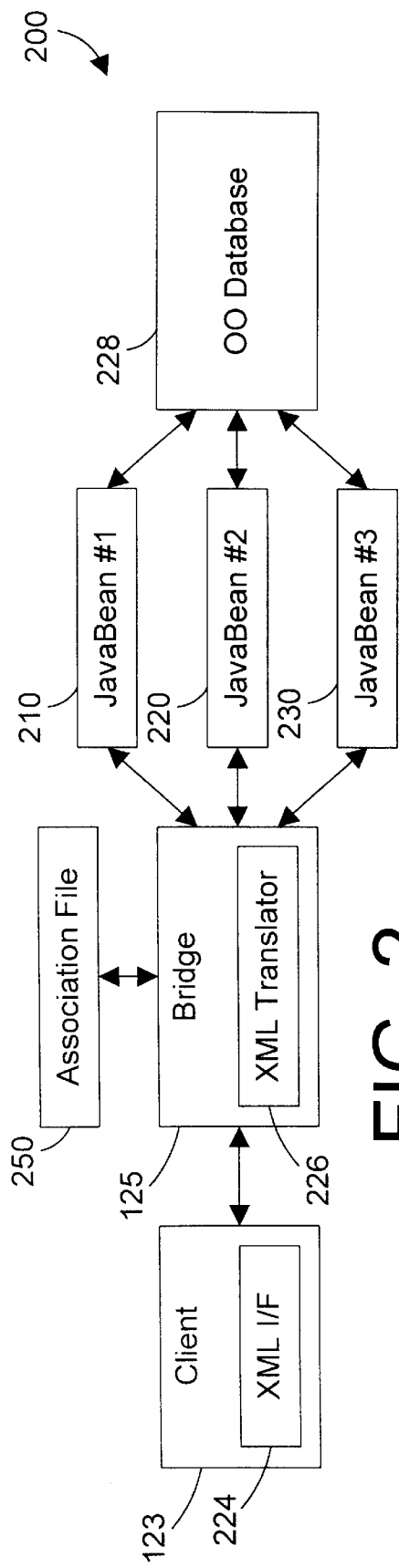
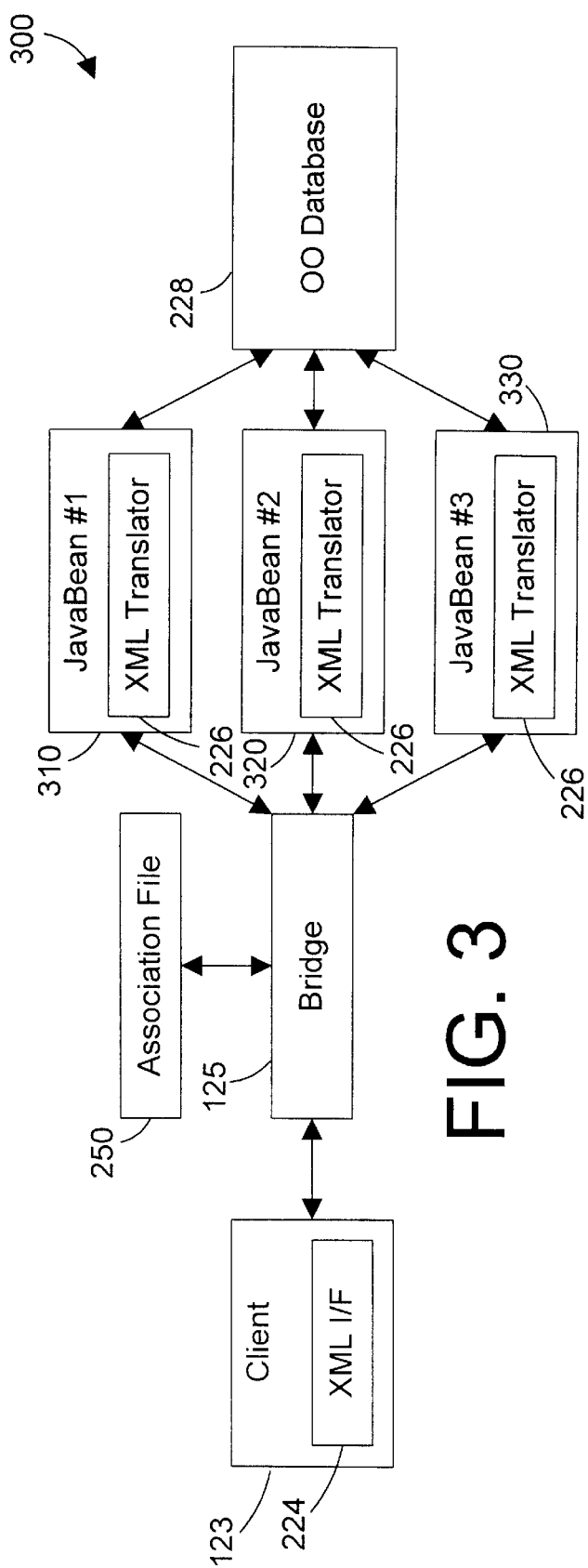
FIG. 2
FIG. 3

Sample Document Type Definition for Data Access - dataAccess.dtd

<!ELEMENT elementRetrieval (keyAsString+ | query)>
<!ELEMENT keyAsString (#PCDATA)>
<!ATTRIBs . . .>
<!ELEMENT query (#PCDATA)>
<!ATTRIBs . . .>

FIG. 5

Sample Data Request in XML Format

610 —— <?xml version="1.0" standalone="no"?>
620 —— <!DOCTYPE CURRENCYREQUEST SYSTEM "dataAccess.dtd">
630 —— <CURRENCYREQUEST>
640 —— <keyAsString target="cf.Currency">USD</keyAsString>
650 —— <keyAsString target="cf.Currency">NWY</keyAsString>
660 —— </CURRENCYREQUEST>

FIG. 6

Sample Document Type Definition for Currency -
Currency.dtd

```
<!ELEMENT currency (currencyCode,currencyAttributes?)>
<!ELEMENT currencyCode (#PCDATA)>
<!ELEMENT currencyAttributes (currencyName?, fractionName?,
      ratioOfFractionToCurrency?, smallestUnit?, showDecimalsOnExternal?,
      showDecimalsOnInternal?, description?)>
<!ELEMENT currencyName (#PCDATA)>
<!ELEMENT fractionName (#PCDATA)>
<!ELEMENT ratioOfFractionToCurrency (#PCDATA)>
<!ELEMENT smallestUnit (#PCDATA)>
<!ELEMENT showDecimalsOnExternal (#PCDATA)>
<!ELEMENT showDecimalsOnInternal (#PCDATA)>
<!ELEMENT description (#PCDATA)>
```

FIG. 7

Sample Currency Data Returned From Database

```
          <?xml version="1.0" standalone="no"?>
810 ──── <!DOCTYPE CURRENCYDOCUMENT SYSTEM "Currency.dtd">
820 ──── <CURRENCYDOCUMENT>
822 ────   <currency>
824 ────     <currencyCode>USD</currencyCode>
826 ────     <currencyName>U.S. Dollars</currencyName>
828 ────   </currency>
830 ────   <currency>
832 ────     <currencyCode>NWY</currencyCode>
834 ────     <currencyName>Norway</currencyName>
836 ────   </currency>
850 ──── </CURRENCYDOCUMENT>
```

FIG. 8

TAGGED MARKUP LANGUAGE INTERFACE WITH DOCUMENT TYPE DEFINITION TO ACCESS DATA IN OBJECT ORIENTED DATABASE

BACKGROUND OF THE INVENTION

1. Technical Field

This invention generally relates to computer systems and more specifically relates to a mechanism and method for accessing data stored in a predefined format in a database using a tagged markup language interface.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Many modem computer systems are a complex combination of different hardware and software that are interconnected on a network. Networks allow computers to share information. Shared information may be stored in a central database. Accessing data in a central database generally requires a user interface that allows a user to structure database queries to retrieve needed information. One example of a popular user interface for retrieving data in a database is known as Structured Query Language (SQL). SQL has a distinct syntax that a person must adhere to in order to retrieve data from a database. Thus, a person that needs to access data in the database must be familiar with one or more specialized software tools for retrieving the needed data from the database. Without a way for a user to easily access data in a database without knowing a specialized database query language, only users that have specialized skills will be able to access this data, making widespread dissemination and use of the data unlikely or problematic.

DISCLOSURE OF INVENTION

According to the preferred embodiments, an apparatus and method defines a markup language for accessing data in a database. The markup language is preferably defined in extensible markup language (XML) by creating suitable document type definitions (DTDs), which define the grammar for accessing data in the database using the markup language. A bridge interprets the data request from the client in markup language format, a suitable database query for the database is formulated, and the data is then placed within a document for delivery in markup language format to the user. As new data types are added to the database, corresponding document type definitions (DTDs) may be dynamically generated, allowing a user to access new kinds of data in a database with a software tool that has a user-friendly graphical user interface without having to manually update the software tool for each new data type that is added to the database.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a block diagram of a computer system according to a first embodiment of the invention that provides a markup language interface to data stored in an object-oriented database;

FIG. 3 is a block diagram of a computer system according to a second embodiment of the invention that provides a markup language interface to data stored in an object-oriented database;

FIG. 5 shows a sample document type definition (DTD) that defines how to formulate a data request for data in the database;

FIG. 6 shows a sample data request in XML format according to the DTD of FIG. 5;

FIG. 7 shows a sample document type definition (DTD) that defines a document format for returning currency information stored in the database to the user in markup language format; and FIG. 8 shows sample currency data that is returned from a database in response to the data request in FIG. 6 according to the document format defined by the DTD of FIG. 7.

BEST MODE FOR CARRYING OUT THE INVENTION

Figure 1:
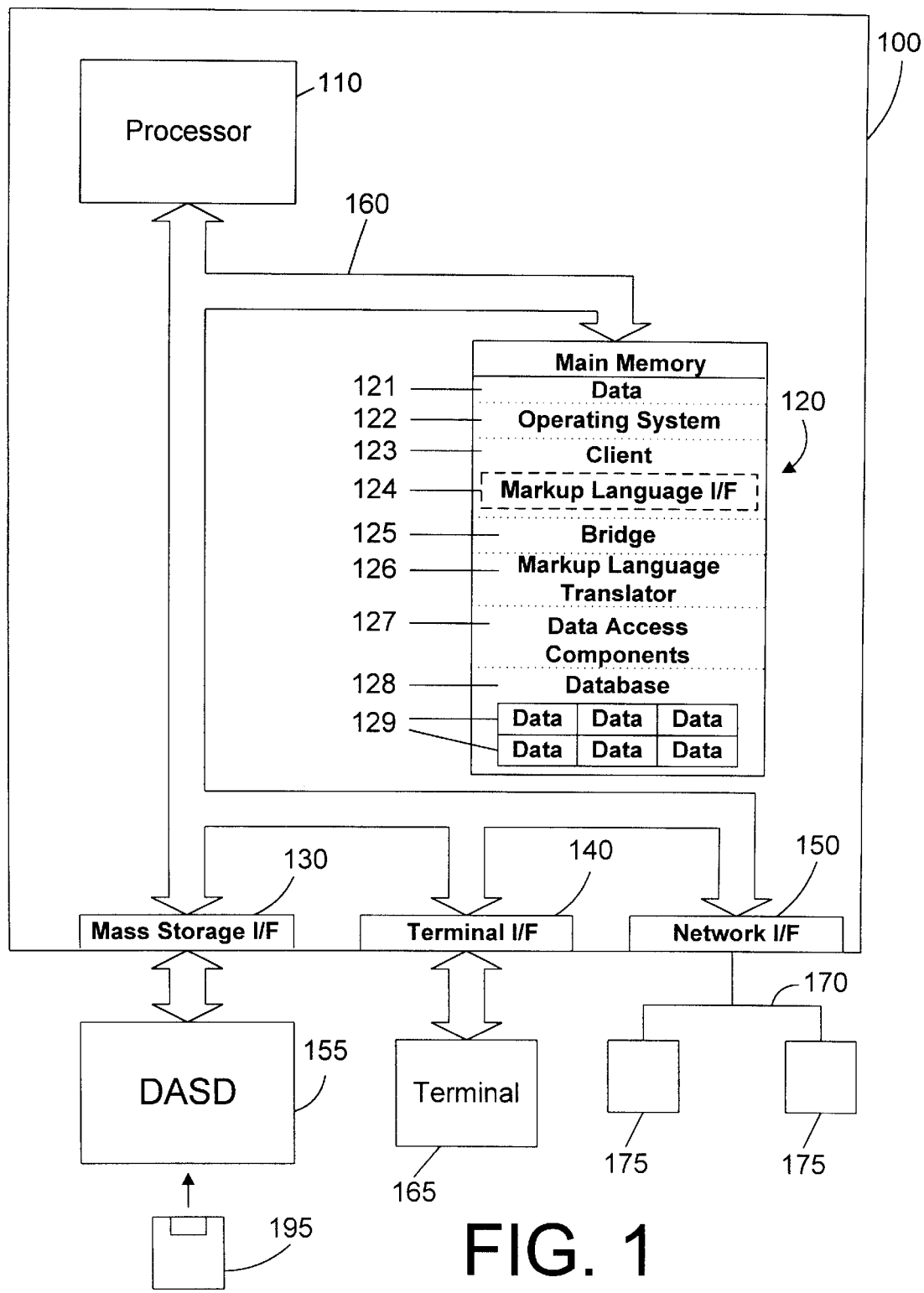
FIG. 1 is a block diagram of an apparatus in accordance with a preferred embodiment of the present invention.

The present invention relates to accessing data stored in a database. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

Java defines various different software components. One of these software components is a JavaBean. A JavaBean is a portion of code that has a highly structured programming model that allows a client to determine the available methods on the JavaBean by using a standard class library to "introspect" the JavaBean. Because the programming model is rigidly defined, an outside entity (an "introspecter") can determine the services that a JavaBean offers. JavaBeans can be wrappers that provide an interface to other objects. A JavaBean may thus provide a gateway to data stored in a separate database. In the alternative, the JavaBean may directly contain all or part of the database.

2. Detailed Description

According to preferred embodiments of the present invention, a user is provided with a markup language interface on a browser for accessing data in a database. When new types of data need to be accessed in the database, a new document type definition (DTD) may be dynamically generated for each new data type.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, a client 123, a bridge 125, a markup language translator 126, one or more data access components 127, and a database 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, client 123, bridge 125, markup language translator 126, data access components 127, and database 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Operating system 122 preferably supports an object oriented programming environment such as that provided, for example, by the Java programming language.

Client 123 represents a user interface for someone that wants to access data in database 128. Most client computers in modem computer networks have access to the Internet. A person accesses information via the Internet using a software tool known as a browser. In the preferred embodiment, client 123 is a browser. A browser is a text and document-based tool that easily handles text, sounds, images, etc., which is collectively known as mime data. Most browsers have user-friendly graphical user interfaces for accessing information via the Internet that are much easier to use than the cryptic commands in a database query language such as SQL. Client 123 includes a markup language interface 124 that allows client 123 to request data from database 128. Instead of providing a cryptic database query interface, markup language interface 124 provides a user-friendly interface that is very easy to use for a user that has experience with browsers, such as web browsers used to access information via the Internet.

Markup language interface 124 is preferably defined in extensible markup language (XML). XML is a very flexible and powerful way to define a markup language. One example of a well-known markup language is hypertext markup language (HTML) that is used to display web pages on the Internet. XML defines a grammar for creating your own markup language. It provides a way to define a set of tags, similar to HTML tags, and to specify the order in which the tags may occur and what tags may enclose other tags.

XML is an evolving industry standard defined by the World Wide Web Consortium, commonly known as W3C. It is a subset of the Standard Generalized Markup Language (SGML) which is targeted for use on the Web. A specification for XML may be found at the W3C website at www.w3.org/TR/PR-xml.html. XML is platform-independent.

An XML document may be parsed, or dissected into its constituent parts, for use by Java applications. The W3C defines certain standards to which XML parser software must be written, and there are a number of XML parsers available for free on the world-wide web. For example, a suitable XML parser is the IBM XML For Java parser which is available from IBM's Yamato research lab.

Referring again to FIG. 1, main memory 120 includes a bridge 125, which is a software program that "bridges the gap" between the markup language interface 124 and database 128. In the preferred embodiment, bridge 125 resides on a server in a network computer system, and is responsible for handling all requests to database 128 made via markup language interface 124.

Markup language translator 126 is used to translate a data request made via markup language interface 124 into a query format for database 128. Regardless of the particular type of markup language interface 124 or database 128 that is actually used, markup language translator 126 provides the translation of data between the two. Thus, markup language translator 126 is used to store data in markup language interface 124 into OO database 128, and is also used to retrieve data in database 128 into markup language interface 124. As described in more detail below, markup language translator 126 may reside within bridge 125, as shown in relation to the first preferred embodiment, or may reside within one or more data access components 127, described below.

Data access components 127 are software components that may be used to access data in database 128. In the preferred embodiment, data access components 127 comprise special types of Java-compatible software known as JavaBeans. A JavaBean is a particular type of software component in the Java programming language that has a well-defined programming model with a defined interface that may be easily determined by invoking get() methods on the JavaBean. While JavaBeans are used in the preferred embodiment, it is understood that data access components 127 includes any type of software component with a well-defined programming model that allows the software component to access data within database 128.

Database 128 is any suitable database that contains data 129. Examples of commonly known databases include relational databases and object oriented databases. Of course, many other types of databases are known and will be developed in the future. The present invention expressly extends to any and all types of databases, regardless of the format or structure of data 129 within the database 128.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Referring to FIG. 2, a system 200 according to a first embodiment of the invention includes client 123 coupled to bridge 125, which is coupled to an association file 250 and one or more JavaBeans, such as JavaBeans 210, 220, and 230, which are in turn coupled to an object oriented database 228. Client 123 includes an XML interface 224, which is one suitable example of markup language interface 124 of FIG. 1. Bridge 125 includes an XML translator 226, which is one suitable example of markup language translator 126 of FIG. 1. The function of bridge 125 is discussed in more detail below. JavaBeans 210, 220 and 230 are suitable examples of data access components 127 of FIG. 1. In the preferred embodiment, each JavaBean defines the structure of data held in a table or object within the database 228, and each access to a particular data type is handled by the corresponding JavaBean. Database 228 is preferably an object oriented database, which is one suitable example for database 128 of FIG. 1.

Figure 4:
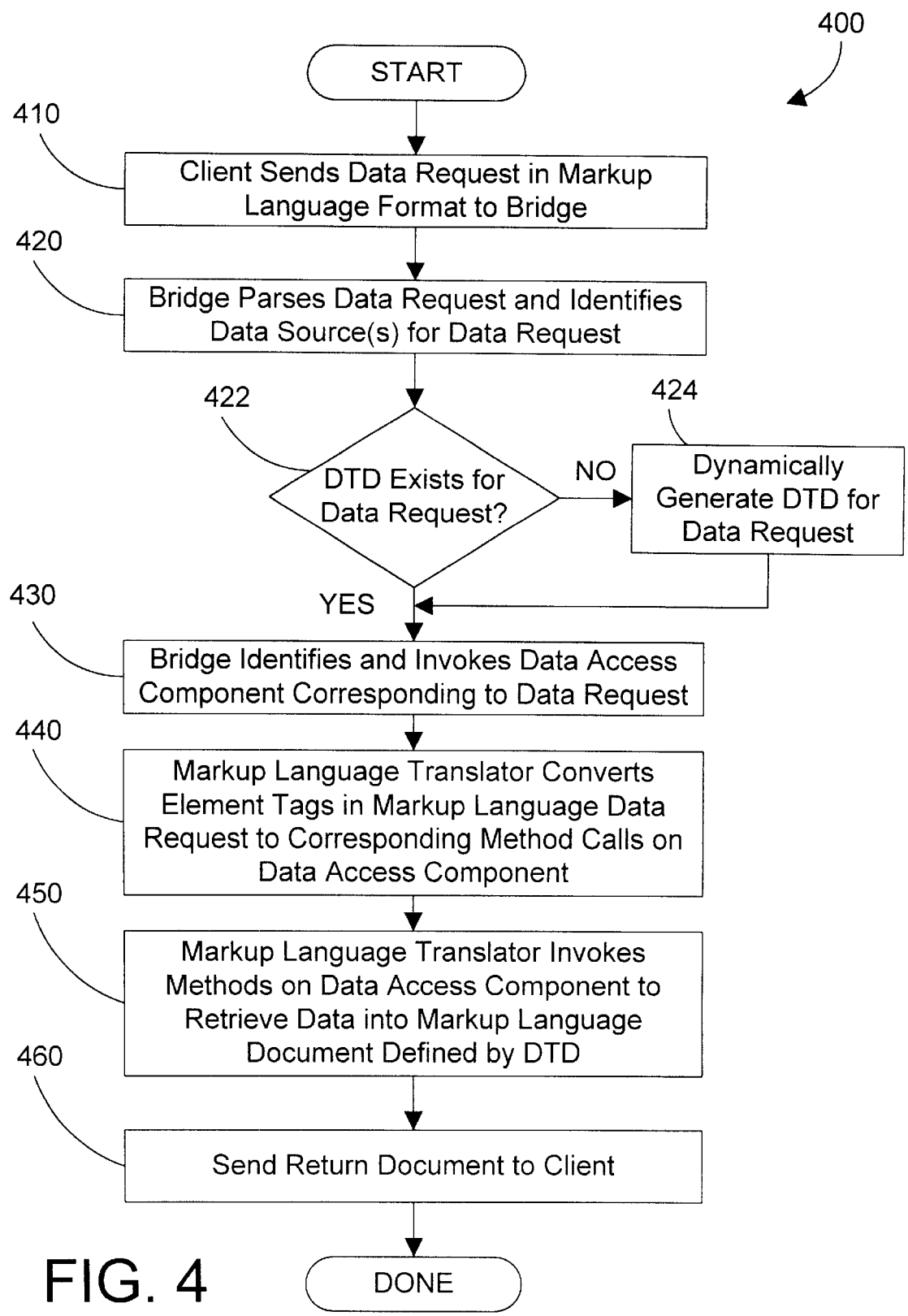
FIG. 4 is a flow diagram of a method in accordance with the preferred embodiments of the invention.

The operation of system 200 is best understood with reference to the flow diagram of FIG. 4, which discloses a method 400 for a client to access data in a database via a markup language interface. First, the client sends a data request in markup language format to the bridge (step 410). In FIG. 2, step 410 corresponds to a user interacting with client 123 to generate a data request, which is then sent via XML interface 224 to bridge 125. Next, the bridge parses the data request and identifies the data source or sources that contain the requested data (step 420). For the example of FIG. 2, we assume that the data request is for data stored in database 228. Next, method 400 determines whether a document type definition (DTD) exists for the requested data type (step 422). In FIG. 2, bridge 125 looks in association file 250 to determine if a DTD exists for the requested data type. Association file 250 preferably contains name-value pairs that correlate data types to their corresponding DTDs. If no DTD exists for the requested data type, a DTD is dynamically generated for the requested data type (step 424). The details of step 424 are explored in more detail below.

Next, the bridge identifies and invokes the data access component corresponding to the data request (step 430). In relation to FIG. 2, this means that bridge 125 determines which JavaBean corresponds to the data type of the request. We assume that JavaBean #2 (220) corresponds to the data type of the request. Next, the markup language translator converts the element tags in the markup language data request to corresponding method calls on the applicable data access component (step 440). For the example of FIG. 2, this means that XML translator 226 in bridge 125 converts the request for each piece of data to a corresponding method call on JavaBean #2 (220). Once the element tags in the markup language data request have been translated to method calls, the markup language translator invokes these methods on the data access component, and the retrieved data is placed into a markup language document defined by the DTD corresponding to the data type of the data request (step 450). Thus, XML translator 226 in bridge 125 invokes one or more methods on JavaBean #2 (220), which causes JavaBean #2 (220) to retrieve the requested data from OO database 228. JavaBean #2 (220) then returns the retrieved data to XML translator 226 in bridge 125, which constructs an XML document with the retrieved data. At this point, the return document is sent to the client (step 460), which means in FIG. 2 that bridge 125 sends the return document to client 123 via XML interface 224.

The detailed configuration for a system 200 in accordance with the design shown in FIG. 2 can take on a variety of different forms. In the preferred embodiment, client 123 is browser software running on a computer, such as an IBM-compatible personal computer, that is connected to a network. XML interface 224 is preferably an extension to an existing web browser, such as Netscape or Microsoft Internet Explorer. A plug-in is one well-known way to extend the capabilities of web browsers, and XML interface 224 could be implemented as a plug-in. In the preferred embodiment, bridge 125 is implemented as a Java servlet that runs on a server that is connected via a network connection to client 123. XML translator 226 may be an integral part of bridge 125, or may be a separate utility that is called by bridge 125. Association file 250 preferably resides on the same server as bridge 125. In addition, JavaBeans 210, 220 and 230 preferably reside on the same server as bridge 125. OO database 228 may be a database that is resident on the same server as bridge 125, but is more likely a separate database on a different computer system that is connected to the server via a network connection. Note that if database 228 is separate from the server, JavaBeans 210, 220 and 230 could also be implemented on the same machine where the database 228 resides. As the discussion above illustrates, many different configurations of systems may fall within the scope of the present invention, which expressly extends to any configuration that could accommodate the components and related flows in FIG. 5.

Referring to FIG. 3, a system 300 in accordance with a second embodiment includes many of the same elements as system 200 of FIG. 2. The primary difference is that XML translator 226 has been moved out of the bridge 125, and into each of the JavaBeans. The bridge 125 acts as a router to route the data request to the appropriate JavaBean, and the translation between XML format and database query is performed in XML translator 226 within the appropriate JavaBean 310, 320 or 330. The steps in method 400 still apply. Moving the XML translator 226 from the bridge 125 into each JavaBean can lighten the load on a server by reducing the size of the servlet that implements bridge 125, but this benefit comes at the expense of duplicating the XML translator code in each JavaBean. Another benefit of placing XML translator 226 within a data access component (such as a JavaBean) is that the programmer of a data access component now has control over how XML requests are processed and returned.

Examples of suitable DTDs for systems 200 and 300 in accordance with the preferred embodiments are shown in FIGS. 5 and 7, with corresponding XML documents shown in FIGS. 6 and 8. In FIG. 5, a document type definition called dataAccess.dtd is shown, which defines two different ways to access data. The keyAsString element allows accessing a single piece of data based on a string that is used as a key to access the data. The query element allows accessing one or more pieces of data based on criteria specified in a database query. A sample data request that conforms to the XML DTD in FIG. 5 is shown in FIG. 6. Line 610 indicates the version of XML, and whether the DTD is a standalone file, which means that the XML file contains all needed data. In line 610, standalone="no" because data is being retrieved from a database into the XML document. Line 620 specifies what type of document will be returned, namely CURRENCYREQUEST for the example of FIG. 6, and also specifies the DTD to be used, namely dataAccess.dtd of FIG. 5. Lines 630 and 660 are the begin and end tags, respectively, for the currency request. Line 640 requests a single piece of data (keyAsString), specifies the controller that allows access to the data, namely cf.Currency, and specifies the units desired, USD for U.S. dollars. Line 650 has a similar format, but will retrieve Norweigian currency values, specified by NWY.

The DTD shown in FIG. 5 must be generated before any data requests to the database may be made via markup language interface 124. The DTD shown in FIG. 7 is a DTD that corresponds to a specific data type, namely currency, stored in database 128. Each element corresponds to tags that can specify the different currency parameters shown in FIG. 7. FIG. 8 is an XML representation of an instance of a currency document that conforms to the DTD of FIG. 8 and that is returned as a result of the data request of FIG. 6. Line 810 defines the type of document to be returned, namely CURRENCYDOCUMENT, and specifies the applicable DTD, namely Currency.dtd (shown in FIG. 7). Lines 820 and 840 represent begin and end tags, respectively, for the currency document. Lines 822 and 828 are begin and end tags, respectively, for a currency definition that complies with the Currency.dtd document type definition. Specifically, lines 824 and 826 specify some of the elements defined in Currency.dtd, namely currencyCode and currencyName. Similarly, lines 830 through 836 define a currency definition that specifies a currencycode of NWY and a CurrencyName of Norway.

One skilled in the art of markup languages, and especially in XML, will readily see how a data request, such as that in FIG. 6, can be formulated according to a document type definition, such as that in FIG. 5. Similarly, one skilled in the art will understand how the instance of data in FIG. 8 corresponds to the document type definition in FIG. 7. The DTDs in FIGS. 5 and 7 and corresponding markup language documents in FIGS. 6 and 8 are presented as an example to illustrate the concepts of the present invention. Because the general nature of markup languages, and XML in particular, are well known in the art, these concepts are not explained in further detail herein.

Referring back to FIG. 4, in step 422, if a DTD does not exist for the data request, a DTD can be dynamically generated for the data request (step 424). This is a very powerful concept that greatly enhances the performance of the present invention when compared to prior art systems. There are two different classes of DTDs that the bridge can access, namely: 1) predefined DTDs that are required to make general retrieval requests, factory requests, and operational requests; and 2) dynamically generated DTDs. The dataAccess DTD in FIG. 5 is an example of a predefined DTD that is needed to make data requests to the database. However, the DTDs that correspond to different data types in the database can be either statically generated (i.e., predefined), or dynamically generated. When the software components that collectively comprise the present invention are installed on a system to allow a client to access data in a database via a markup language interface, all of the known data types can be statically generated before the system is started up. This allows for good performance because the DTDs for all known data types already exist and are listed in the association file along with their corresponding data access components. When a new data type is added to the database, a DTD can be statically generated and added to the list of DTDs in the association file. In the alternative, if the bridge detects that no DTD exists in the association file for the data type of the data request, it can dynamically generate a DTD and store the name-value pair that correlates the DTD to its corresponding data type in the association file. The dynamic generation of DTDs, represented in step 424 of FIG. 4, is performed by querying the appropriate data access component to determine the structure and format of data in the database, which is reflected in the structure of the data access component. To dynamically build DTDs, a well-defined programming model is required. A JavaBean, for example, is a data access component that can expose its properties through a very rigorous pattern of methods: getX/setX defines a property named X, which becomes an element tag in the DTD. By invoking all getX/setX methods on a JavaBean, a DTD can be dynamically built that corresponds to the properties of the JavaBean. This same approach works well with relational databases, which have a well-defined structure of rows and columns with particular names that may be accessed to dynamically generate a DTD with tags that correspond to the row and column names.

While the dynamic generation of DTDs at run-time is possible within the scope of the present invention, in practice dynamic DTD generation would probably be more useful before an application is deployed. A developer could thus use the bridge to dynamically generate DTDs, modify the DTDs as needed to make them perfect, and then list the modified DTDs in the association table. These DTDs would then be treated as statically-generated DTDs at run-time.

The present invention thus provides an apparatus and method for accessing data in a database via a markup language interface. A user formulates and submits a data request in markup language format. The request is translated into an appropriate query to the database, which returns the requested data. The requested data is then formatted into a return document of a specified type in markup language format defined by a document type definition. If no document type definition is defined for a particular data request, a document type definition corresponding to the data request can be dynamically generated and used to access the data in the database.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments in FIGS. 2 and 3 show all JavaBeans 210, 220 and 230 communicating with a single database 228, in reality one or more of these JavaBeans may contain data rather than accessing data in an external database, or different JavaBeans may access different databases. In addition, FIGS. 2 and 3 show software components (namely JavaBeans) between bridge 125 and OO database 228. However, it is equally within the scope of the present invention for XML translator 226 to communicate with OO database 228 directly, without going through a data access component. This means that XML translator 226 of FIG. 2 may interact directly with OO database 228, and that a stand-alone XML translator could communicate between bridge 125 and OO database 228 in FIG. 3. These and other variations are expressly within the scope of the present invention.

I claim:
1. A method for accessing data in a database, the method comprising the steps of:
    requesting access to data in a database in a markup language format;
    translating the request into a query to the database using a document type definition that corresponds to a data type of the request, the document type definition defining how to access data in the database;
    creating a return document in markup language format;

submitting the query to the database;

inserting data retrieved from the database in response to the query into the return document; and returning the return document.

2. An apparatus comprising:

at least one processor;

a memory coupled to the at least one processor;

a markup language interface residing in the memory for requesting access to data in a database; and a markup language translator residing in the memory for translating a request from the markup language interface into a query to the database, and for inserting data retrieved from the database in response to the query into a document that is formatted to be read by the markup language interface, wherein the markup language interface comprises at least one document type definition that defines how to access data in the database.

3. The apparatus of claim 1 wherein the document type definition is defined in extensible markup language (XML).

4. The apparatus of claim 1 wherein the at least one document type definition corresponds to at least one data type in the database.

5. The apparatus of claim 4 wherein the document type definition is defined in extensible markup language (XML).

6. The apparatus of claim 4 wherein the markup language translator determines if a document type definition exists for a data type corresponding to the requested data, and if not, the markup language translator dynamically generates the document type definition for the requested data.

7. The apparatus of claim 1 further comprising a data access component residing in the memory that is invoked to access the data in the database.

8. The apparatus of claim 1 further comprising at least one data access component that receives the request to access the data in the database and that returns the requested data to the markup language interface.

9. The apparatus of claim 1 further comprising an association file that is used to correlate a data access component to an associated document type definition.

10. The apparatus of claim 1 wherein the document type definition defines a plurality of tags and a plurality of method calls on at least one data access component that may access the database, each of the plurality of tags having a corresponding method call for retrieving data from the database.

11. An apparatus comprising:

means for requesting access to data in a database in a markup language; and means for translating a request from the means for requesting access into a query to the database, and for inserting data retrieved from the database in response to the query into a document that is formatted in the markup language; and means for dynamically generating a document type definition for the requested data if no document type definition exists for a data type corresponding to the requested data.

12. A method for accessing data in a database, the method comprising the steps of:

requesting access to data in a database in a markup language format;

determining whether a document type definition exists for a data type of the request;

if no document type definition exists, dynamically generating a document type definition that corresponds to the data type of the request;

creating a return document in the markup language format defined by the document type definition;

submitting the query to the database;

inserting data retrieved from the database in response to the query into the return document; and returning the return document.

13. A method for accessing data in a database, the method comprising the steps of:

requesting access to data in a database in a markup language format;

identifying and invoking at least one data access component corresponding to the request;

converting a plurality of element tags in the request to corresponding method calls on the at least one data access component;

invoking the method calls on the at least one data access component to retrieve the data from the database;

creating a return document in markup language format;

submitting the query to the database;

inserting data retrieved from the database in response to the query into the return document; and returning the return document.

14. A method for accessing data in an object oriented database, the method comprising the steps of:

requesting access to data in the object oriented database in a markup language format;

determining whether a document type definition exists for a data type of the request;

if no document type definition exists, dynamically generating a document type definition that corresponds to the data type of the request;

identifying and invoking at least one data access component corresponding to the request;

converting a plurality of element tags in the request to corresponding method calls on the at least one data access component;

invoking the method calls on the at least one data access component to retrieve the data from the database;

creating a return document in markup language format defined by the document type definition;

inserting the data retrieved from the database into the return document; and returning the return document.

15. An apparatus comprising:

at least one processor;

a memory coupled to the at least one processor;

an object oriented database residing in the memory;

at least one JavaBean residing in the memory and providing an interface for accessing data stored in the object oriented database;

an XML interface to a client browser residing in the memory, the XML interface including a first document type definition that defines at least one way to access data in the object oriented database;

an association file residing in the memory, the association file correlating at least one document type definition with an associated JavaBean;

a bridge residing in the memory and coupled to the XML interface and to the association file, the bridge routing at least one data request from a user via the XML interface to at least one JavaBean corresponding to at least one data type stored in the object oriented database, the bridge receiving the requested data from the at least one JavaBean and formatting the data into a return document with a format defined by a second document type definition.

16. The apparatus of claim 15 wherein the document type definition defines a plurality of tags and a plurality of method calls on at least one data access component that may access the database, each of the plurality of tags having a corresponding method call for retrieving data from the database.

17. A program product comprising:

a markup language interface for requesting access to data in a database, wherein the markup language interface comprises at least one document type definition that defines how to access data in the database;

a markup language translator for translating a request from the markup language interface into a query to the database, and that inserts data retrieved from the database in response to the query into a document that is formatted to be read by the markup language interface; and signal bearing media bearing the markup language interface and the markup language translator.

18. The program product of claim 17 wherein the signal bearing media comprises recordable media.

19. The program product of claim 17 wherein the signal bearing media comprises transmission media.

20. The program product of claim 17 wherein the document type definition is defined in extensible markup language (XML).

21. The program product of claim 17 wherein the at least one document type definition corresponds to at least one data type in the database.

22. The program product of claim 21 wherein the markup language translator determines if a document type definition exists for a data type corresponding to the requested data, and if not, the markup language translator dynamically generates the document type definition for the requested data.

23. The program product of claim 21 wherein the document type definition is defined in extensible markup language (XML).

24. The program product of claim 17 further comprising a data access component that is invoked to access the data in the database.

25. The program product of claim 17 further comprising at least one data access component that receives the request to access the data in the database and that returns the requested data to the markup language interface.

26. The program product of claim 17 further comprising an association file that is used to correlate a data access component to an associated document type definition.

27. The program product of claim 17 wherein the document type definition defines a plurality of tags and a plurality of method calls on at least one data access component that may access the database, each of the plurality of tags having a corresponding method call for retrieving data from the database.

* * * * *